United States Patent
Hood et al.

(10) Patent No.: US 8,304,139 B2
(45) Date of Patent: Nov. 6, 2012

(54) FUEL CELL FLUID FLOW FIELD PLATES

(75) Inventors: Peter D. Hood, Syston (GB); Philip J. Mitchell, Loughborough (GB); Paul L. Adcock, Long Whatton (GB); Simon E. Foster, Rothley (GB)

(73) Assignee: Intelligent Energy Limited, Leicestershire (GB)

( * ) Notice: Subject to any disclaimer, the term of this patent is extended or adjusted under 35 U.S.C. 154(b) by 1886 days.

(21) Appl. No.: 10/494,628

(22) PCT Filed: Oct. 3, 2002

(86) PCT No.: PCT/GB02/04483
§ 371 (c)(1),
(2), (4) Date: Nov. 10, 2004

(87) PCT Pub. No.: WO03/041199
PCT Pub. Date: May 15, 2003

(65) Prior Publication Data
US 2005/0048351 A1 Mar. 3, 2005

(30) Foreign Application Priority Data
Nov. 7, 2001 (GB) .................................. 0126688.1

(51) Int. Cl.
*H01M 8/04* (2006.01)
*H01M 8/24* (2006.01)

(52) U.S. Cl. ........ 429/514; 429/457; 429/456; 429/455; 429/454; 429/513

(58) Field of Classification Search .................. 429/514, 429/513, 512, 457, 456, 455, 454
See application file for complete search history.

(56) References Cited

U.S. PATENT DOCUMENTS

| 4,988,583 A | 1/1991 | Watkins et al. |
| 5,108,849 A | 4/1992 | Watkins et al. |
| 5,212,023 A | 5/1993 | Diethelm |

(Continued)

FOREIGN PATENT DOCUMENTS

CA 2380508 2/2001

(Continued)

OTHER PUBLICATIONS

International Search Report in Application PCT/GB02/04483, dated Aug. 22, 2003.

(Continued)

*Primary Examiner* — Helen O Conley
(74) *Attorney, Agent, or Firm* — Fish & Richardson P.C.

(57) ABSTRACT

A bipolar fluid flow flied plate for a fuel cell delivers fuel to a porous anode electrode and oxidant to an adjacent porous cathode electrode. The flow field plate comprises an electrically conductive, non-porous sheet into which fluid flow conduits are formed. A first fluid flow channel is patterned into a first face of the sheet and a second fluid flow channel patterned into the opposite face of the sheet. The pattern of the first channel comprises an interdigitated comb that co-operates with a pattern of the second channel comprising a continous serpentine path, so that no portion of the first channel directly overlies the pattern of the second channel over a substantial active area of the sheet. This allows the channels to be formed with combined depths that exceed the total plate thickness, thereby increasing fluid flow volumes.

7 Claims, 6 Drawing Sheets

U.S. PATENT DOCUMENTS

| | | | |
|---|---|---|---|
| 5,300,370 | A | 4/1994 | Washington et al. |
| 5,482,680 | A | 1/1996 | Wilkinson et al. |
| 5,521,018 | A | 5/1996 | Wilkinson et al. |
| 5,683,828 | A | 11/1997 | Spear et al. |
| 6,071,635 | A | 6/2000 | Carlstrom, Jr. |
| 6,207,312 | B1 | 3/2001 | Wynne et al. |
| 6,296,964 | B1 | 10/2001 | Ren et al. |
| 6,322,919 | B1 | 11/2001 | Yang et al. |
| 6,503,653 | B2 | 1/2003 | Rock |
| 2002/0081477 | A1 | 6/2002 | McLean et al. |
| 2003/0008200 | A1* | 1/2003 | Ito et al. .................. 429/44 |
| 2005/0106445 | A1 | 5/2005 | Mitchell et al. |
| 2005/0202304 | A1 | 9/2005 | Peace et al. |
| 2006/0154130 | A1 | 7/2006 | Hood |
| 2006/0257699 | A1 | 11/2006 | Hood et al. |
| 2006/0292429 | A1 | 12/2006 | Baird et al. |
| 2007/0166596 | A1 | 7/2007 | Benson |
| 2008/0145738 | A1 | 6/2008 | Benson |
| 2008/0248336 | A1 | 10/2008 | Matcham et al. |
| 2008/0314660 | A1 | 12/2008 | Davies et al. |
| 2009/0029231 | A1 | 1/2009 | Hood et al. |

FOREIGN PATENT DOCUMENTS

| | | |
|---|---|---|
| CA | 2365877 | 6/2002 |
| EP | 0 415 733 | 10/1994 |
| EP | 0851518 | 5/2001 |
| GB | 959557 | 6/1964 |
| GB | 1151373 | 5/1969 |
| JP | 59217955 | 4/1985 |
| JP | 02-278667 | 11/1990 |
| JP | 04-306568 | 10/1992 |
| JP | 08-287928 | 11/1996 |
| JP | 09-504901 | 5/1997 |
| JP | 09-259904 | 10/1997 |
| JP | 2000-251907 | 9/2000 |
| WO | WO95/08850 | 3/1995 |
| WO | WO01/04982 | 1/2001 |
| WO | WO01/13449 | 2/2001 |

OTHER PUBLICATIONS

Examination Report in Application GB0126688.1, dated Mar. 20, 2003.
European Patent Office Examination Report in Application No. 02765083.7, dated Jul. 10, 2009.
English Translation of Notification of Reason for Refusal in Japanese Application No. 2003-543127, dated Jun. 24, 2009.
Machine Translation of Japanese Application No. 09-259904.
Machine Translation of Japanese Application No. 2000-251907.
Machine Translation of Japanese Patent Publication 08-287928.
Examination Report in Canadian Patent Application No. 2,471,122, dated Oct. 1, 2009.
First Examination Report in Brazil Application No. PI 0206313-1, dated Jan. 13, 2010 (English translation).
Response to First Office Action in Brazil Application No. PI 0206313-1, dated Apr. 22, 2010.
Second Examination Report in Brazil Application No. PI 0206313-1, dated Oct. 27, 2010 (English translation).
Response to Second Office Action in Brazil Application No. PI 0206313-1, dated Jan. 19, 2011.
Response to First Examiner's Report in Canadian Application No. 2,471,122, dated Apr. 1, 2010.
Response to First Office Action in EP Application No. 02765083.7, dated Sep. 2, 2009.
Second Examination Report in EP Application No. 02765083.7, dated Dec. 1, 2011.
Response to Second Office Action in EP Application No. 02765083.7, dated Apr. 2, 2012.
Response to First Office Action in Japanese Application No. 2003-543127, dated Oct. 21, 2009.
Second Office Action in Japanese Application No. 2003-543127, dated Apr. 14, 2010 (English translation).
Response to Second Office Action in Japanese Application No. 2003-543127, dated Jul. 2, 2010.
Response to First Office Action in Norwegian Application No. 20033090, dated Aug. 26, 2009.
First Office Action in Russian Application No. 2004117094/09 (018428), dated Jul. 7, 2006.
Response to First Office Action in Russian Application No. 2004117094/09 (018428), dated Sep. 20, 2006.
Written Opinion in Singapore Application No. 200303487-3, dated Dec. 9, 2004.
Response to Written Opinion in Singapore Application No. 200303487-3, dated May 11, 2005.
Examination Report in UK Application No. GB0126688.1, dated Apr. 20, 2004.
Response to Examination Report in UK Application No. GB0126688.1, dated Aug. 31, 2004.
Examination Report in counterpart Norwegian Application No. 20033090, dated May 20, 2009 (w/Eng. Translation).

* cited by examiner

FUEL CELL FLUID FLOW FIELD PLATES

The present invention relates to fuel cells, and in particular to flow field plates suitable for use in solid polymer electrolyte fuel cells, which flow field plates act as fluid delivery conduits to electrode surfaces of the fuel cell.

Figure 1:
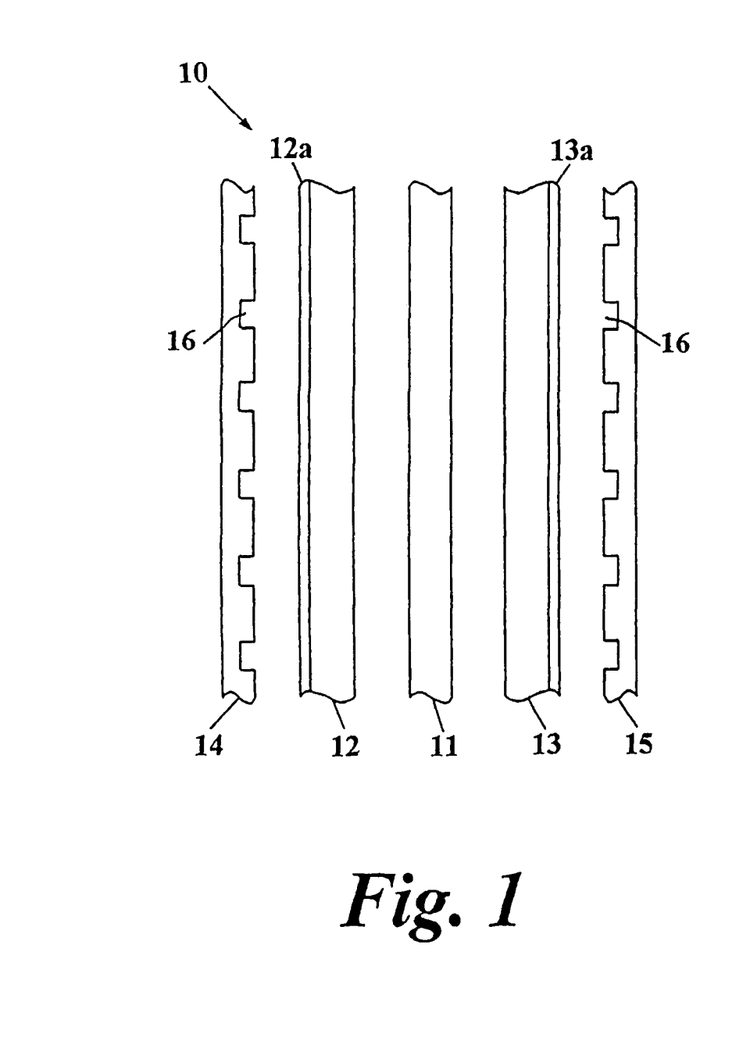
FIG. 1 is an exploded cross-sectional view of a prior art fuel cell.

Conventional electrochemical fuel cells convert fuel and oxidant into electrical energy and a reaction product. A typical layout of a conventional fuel cell 10 is shown in FIG. 1 which, for clarity, illustrates the various layers in exploded form. A solid polymer ion transfer membrane 11 is sandwiched between an anode 12 and a cathode 13. The polymer membrane allows protons to traverse the membrane, but blocks the passage of electrons. Typically, the anode 12 and the cathode 13 are both formed from an electrically conductive, porous material such as porous carbon, to which small particles of platinum and/or other precious metal catalyst are bonded. The anode 12 and cathode 13 are often bonded directly to the respective adjacent surfaces of the membrane 11. This combination is commonly referred to as the membrane-electrode assembly, or MEA.

Sandwiching the polymer membrane and porous electrode layers is an anode fluid flow field plate 14 and a cathode fluid flow field plate 15. Intermediate backing layers 12a and 13a may also be employed between the anode fluid flow field plate 14 and the anode 12 and similarly between the cathode fluid flow field plate 15 and the cathode 13. The backing layers are of a porous nature and fabricated so as to ensure effective diffusion of gas to and from the anode and cathode surfaces as well as assisting in the management of water vapour and liquid water. Throughout the present specification, references to the electrodes (anode and/or cathode) are intended to include electrodes with or without such a backing layer.

The fluid flow field plates 14, 15 are formed from an electrically conductive, non-porous material by which electrical contact can be made to the respective anode electrode 12 or cathode electrode 13. At the same time, the fluid flow field plates must enable the delivery and/or exhaust of fluid fuel, oxidant and/or reaction product (and/or other diluent gases not taking part in the reaction) to or from the porous electrodes. This is conventionally effected by forming fluid flow passages in a surface of the fluid flow field plates, such as grooves or channels 16 in the surface presented to the porous electrodes.

Figure 2:
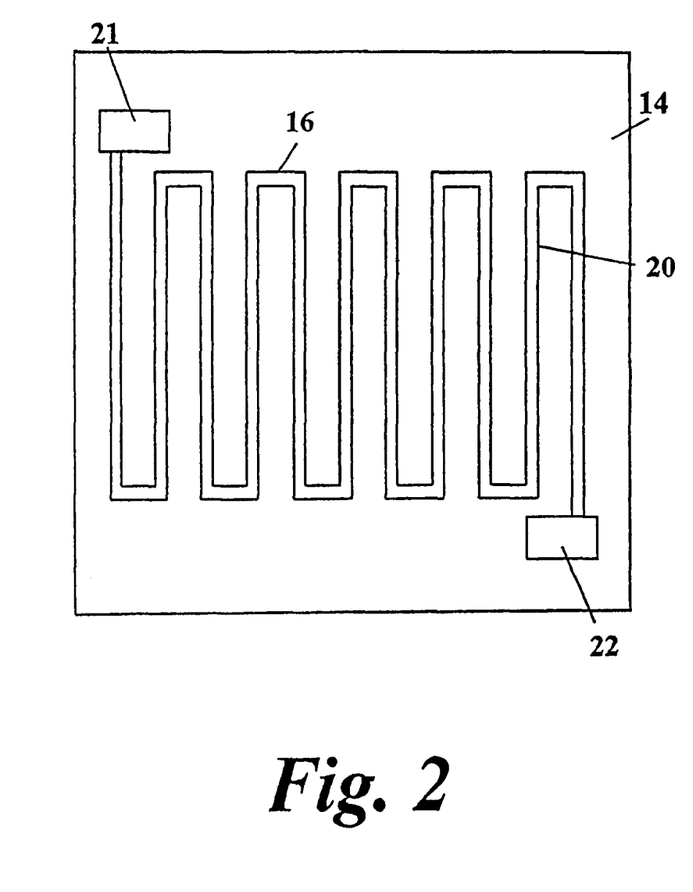
FIG. 2 is a plan view of a prior art fluid flow field plate in the fuel cell of FIG. 1.

With reference also to FIG. 2, it will be seen that one prior art configuration of fluid flow channel, such as that taught in U.S. Pat. No. 5,108,849 is a serpentine structure 20 in a face of the anode 14 (or cathode) having an inlet manifold 21 and an outlet manifold 22.

In a typical application, in the anode fluid flow field plate 14, hydrogen gas is delivered into the serpentine channel 20 from the inlet manifold 21. In the cathode fluid flow field plate 15, oxidant (e.g. oxygen gas) is delivered into the serpentine channel 20 from the inlet manifold. Because it is important to maintain a good supply of oxygen to the porous cathode electrode 13, and because reaction product (water) accumulates therein, it is often important to maintain a high flow rate of oxidant gas through the serpentine channel 20 from the inlet manifold 21 to the outlet manifold 22, to expel depleted gas supply and product water.

Because the voltage produced by a single fuel cell is quite low (typically approximately 0.7 V), conventionally multiple cells are connected in series with the electrically conductive, cathode fluid flow field plate of one cell being placed in electrical contact with the adjacent anode fluid flow field plate of the next cell.

Figure 3:
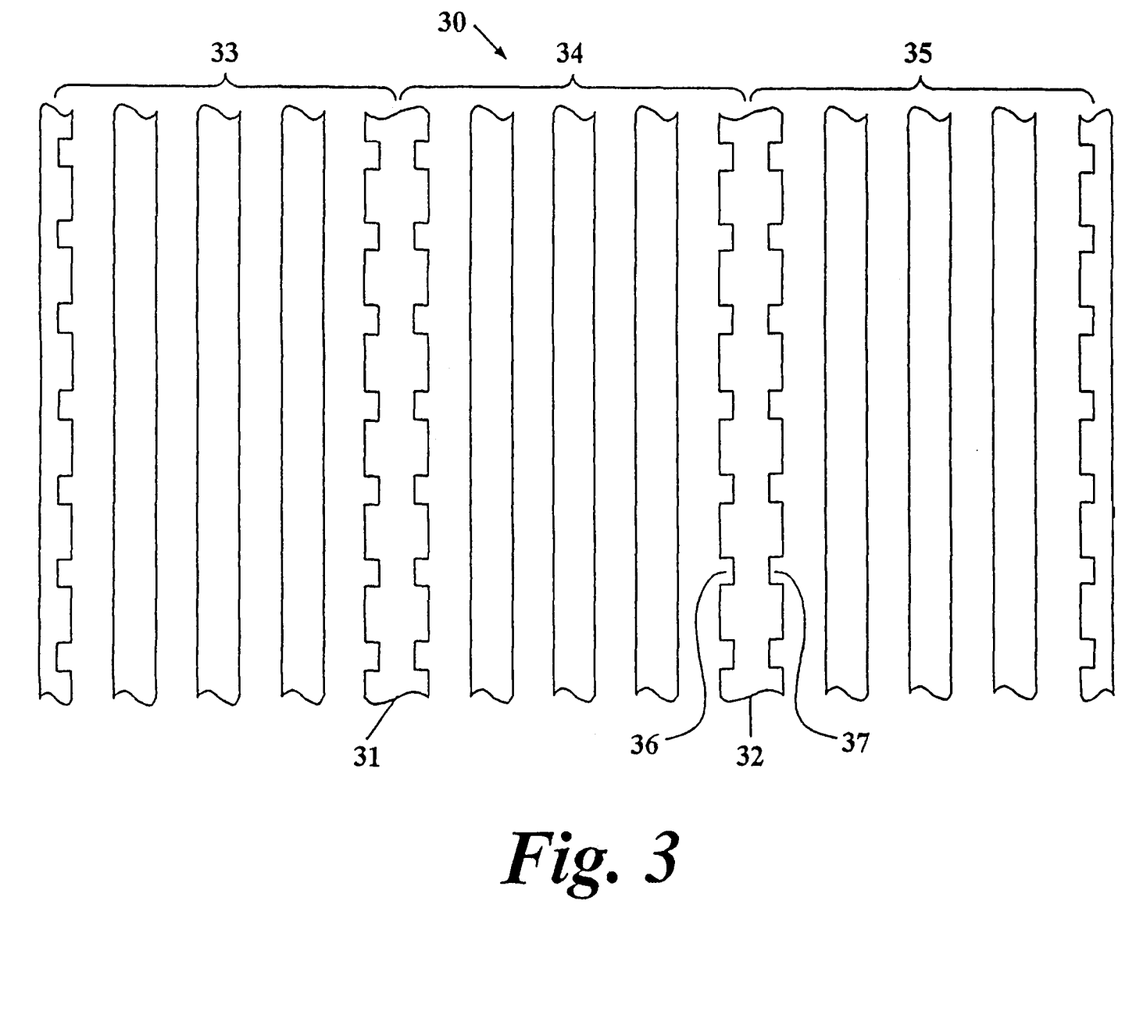
FIG. 3 is an exploded cross-sectional view of a prior art series-connected fuel cell stack.

As shown in FIG. 3, in order to simplify construction of a series-connected array or "stack" 30 of fuel cells, it has been proposed in the prior art to utilise a single fluid flow field plate 31, 32 shared between adjacent cells. By way of example, cell 34 shares plate 32 with adjacent cell 35. The left hand face (as represented in FIG. 3) of bipolar plate 32 acts as a cathode for cell 34 and incorporates cathode fluid flow channels 36, while the right hand face acts as an anode for cell 35 and incorporates anode fluid flow channels 37. Thus, in bipolar fluid flow field plate 32, channels are formed in both faces of the plate and the number of separate fluid flow field plates required in the stack of fuel cells is consequently reduced.

The present invention is directed to providing still further improvements in the construction of fluid flow field plates and a reduction in the dimensions of a fuel cell stack.

According to one aspect, the present invention provides a bipolar fluid flow field plate for a fuel cell comprising an electrically conductive, non-porous sheet having a first fluid flow channel patterned into a first face of the sheet and a second fluid flow channel patterned into the opposite face of the sheet, in which the pattern of the first channel is configured to have no portion thereof directly overlying the pattern of the second channel over a substantial area of the sheet.

According to another aspect, the present invention provides a bipolar fluid flow field plate for a fuel cell comprising an electrically conductive, non-porous sheet having a first fluid flow channel patterned into a first face of the sheet and a second fluid flow channel patterned into the opposite face of the sheet, in which the combined depth of the first and second channels in an active area of the plate exceeds the total thickness of the plate.

Embodiments of the present invention will now be described by way of example and with reference to the accompanying drawings in which.

A critical factor in the commercial viability of fuel cells is the deliverable energy per unit volume of fuel cell. There is an ever-increasing demand to deliver more power per unit volume, and this has led to some improvements such as the bipolar fluid flow field plate configuration indicated in FIG. 3 and FIG. 4. To decrease the dimension of the fuel cell stack still further, the present inventors have recognised that the bipolar plate can be substantially reduced in thickness by co-ordinating channel structures on opposing faces of the plates 31, 32.

Figure 4:
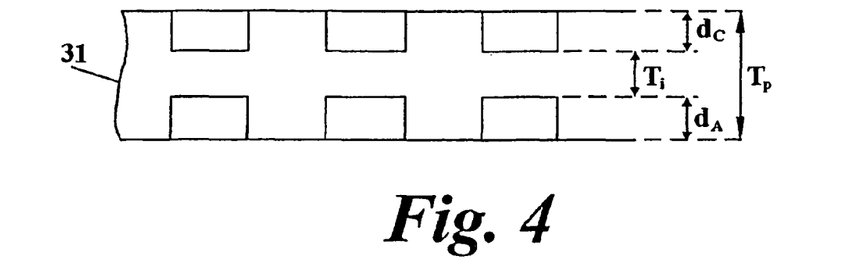
FIG. 4 is a cross-sectional view of a portion of the bipolar fluid flow field plate in FIG. 3.

In the prior art configuration of FIG. 4, the thickness of bipolar plates 31, 32 has been determined according to the depth of channel required on both sides of the plate, plus sufficient thickness of plate lying between the channel bottoms to ensure structural integrity of the plate. This is illustrated in FIG. 4. As shown, the bipolar plate 31, 32 thickness $T_P$ generally equals the anode channel depth, $d_A$ plus cathode channel depth, $d_C$ plus an intermediate plate thickness, $T_i$.

Figure 5:
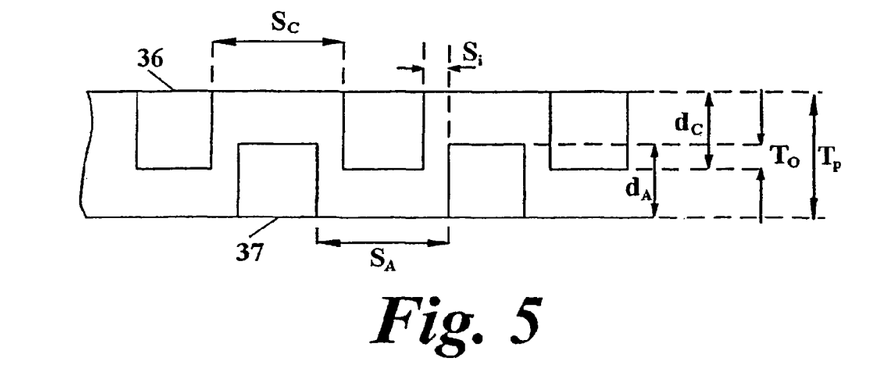
FIG. 5 is a cross-sectional view of a portion of a bipolar fluid flow field plate according to one aspect of the present invention.

According to the present invention, the anode and cathode fluid flow channel configurations on both faces of the bipolar plates are co-ordinated so that the number of cross-over points where the anode channels 37 overlie the cathode channels 36 is reduced, preferably to zero.

Where this is effected, the anode and cathode fluid flow channels 36, 37 are themselves co-ordinated in an interleaved fashion as depicted in FIG. 5. In this configuration, it will be noted that the plate thickness $T_P$ now generally equals the anode channel depth, $d_A$ plus cathode channel depth, $d_C$ minus a channel depth overlap, $T_O$. The channel spacing or wall thickness ($S_A$, $S_C$) on each side of the plate is increased sufficiently to accommodate the width of the intervening channel on the other side of the plate, plus an internal channel spacing $S_i$ within the plate between each adjacent channel on alternating sides of the plate.

Figure 6:
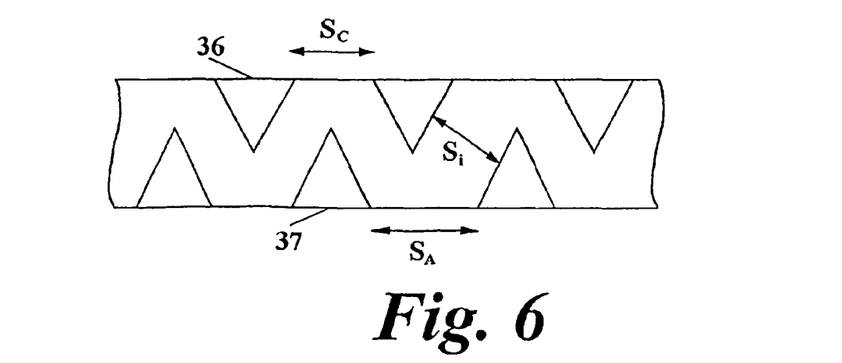
FIG. 6 is a cross-sectional view of a portion of a bipolar fluid flow field plate according to another aspect of the present invention.

In FIG. 5, a rectangular channel profile is shown, as can be conveniently formed using various chemical etching techniques, electrochemical machining, abrasive machining or other suitable material removal processes. As evident from FIG. 6, other channel profiles such as a triangular profile can be used to similar effect. In FIG. 6, however, it will be noted that the particular channel profile allows that the channel spacing $S_A$ and $S_C$ on each side of the plate need not be increased to the same extent as in FIG. 5 in order to maintain an effective internal channel spacing $S_i$. In these examples, a "past-centre" material removal process is used to form the channels 36, 37 to a depth greater than the centre of the plate thickness.

To allow the use of a "past-centre" material removal process, the configuration of the anode and cathode fluid flow channels are coordinated to avoid any superposition of the channels over a substantial portion, and preferably all, of the active area of the bipolar plate faces.

Figure 7:
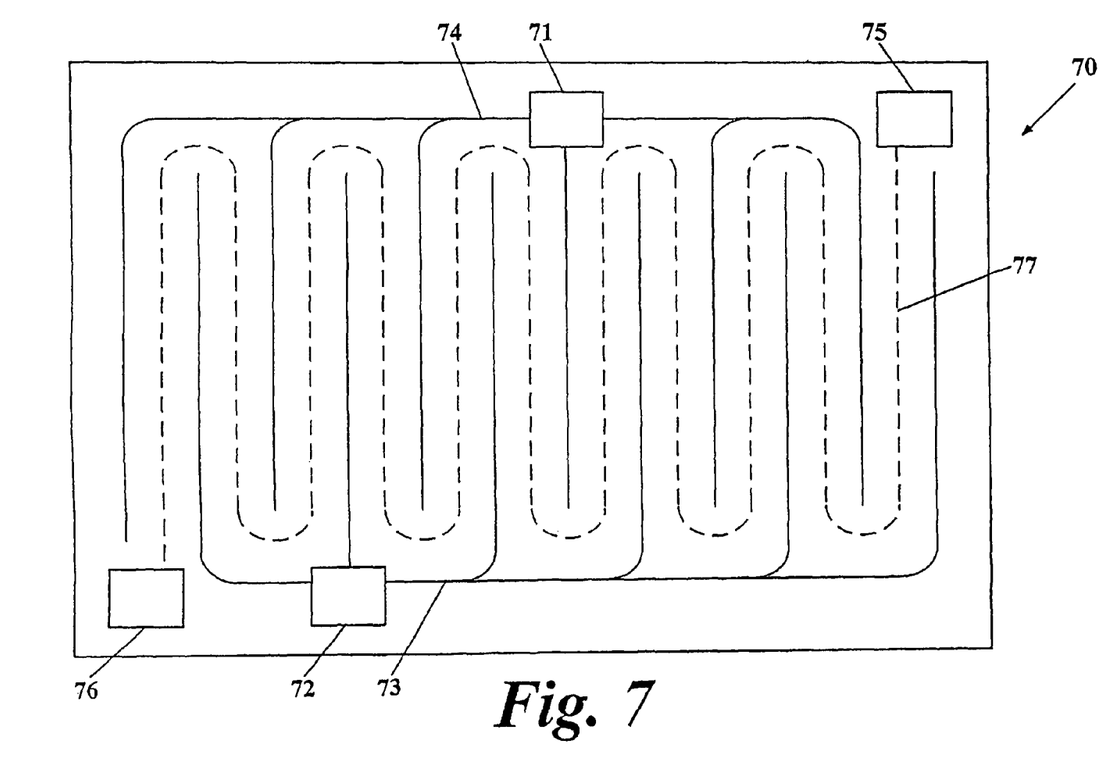
FIG. 7 is a schematic plan view of continuous serpentine and interdigitated comb channels formed in opposing faces of the plate of FIG. 5 or FIG. 6.

An exemplary serpentine and interdigitated comb pattern is shown schematically in FIG. 7. In FIG. 7, bipolar fluid flow field plate 70 includes a first inlet manifold 71 which preferably comprises an aperture through the fill thickness of the plate 70. The first inlet manifold 71 communicates with comb structure channels 74 which are formed on a first surface of the bipolar plate. Comb structure channels 73 direct the fluid to the corresponding first outlet manifold 72, which also preferably comprises an aperture through the full thickness of the plate 70.

A second inlet manifold 75 and a second outlet manifold 76 preferably comprise respective apertures through the full thickness of the plate. On the opposite surface of the bipolar plate, and therefore shown in dashed line form, is a serpentine channel 77 that communicates with the second inlet manifold 75 and the second outlet manifold 76 respectively. In use, gas is supplied through the second inlet manifold 75, and passed through the serpentine channel 77 from which it is transported into an adjacent porous electrode (via a backing layer if one is used). Unused gas, together with water reaction product is passed out from the serpentine channel 77 into cathode outlet manifold 76.

It will be understood that the view of the channels 73, 74, 77 in FIG. 7 is schematically represented only, and that the number of "teeth." in each interdigitated comb structure of the channel pattern, as well as the number of turns in the serpentine structure, is considerable. In a typical example, the plate channel density provides 5 channels per centimetre of plate surface. A typical plate having electrode dimensions 10 cm by 10 cm provides a serpentine channel having 25 passes across the width of the plate in one direction, and a pair of interdigitated combs together providing a corresponding number of "teeth" extending across the width of the plate between the serpentine passes.

In a presently preferred configuration having approximately rectangular cross-section channels, a typical bipolar fluid flow field plate thickness $T_P$ is 0.8 mm while the anode and cathode channels 73, 74 and 77 have a depth ($d_A$, $d_C$) of approximately 0.5 mm. The channel depth overlap, $T_O$ is therefore 0.2 mm. Preferably, the channel widths are 0.7 mm, the channel spacings $S_C$ and $S_A$ on each side of the bipolar plate are 1.1 mm, and the internal channel spacing $S_i$ is 0.2 mm.

In preferred embodiments, the plate thickness $T_P$ lies in the range 0.3 mm to 1.5 mm, the channel depths $d_A$ and $d_C$ lie in the range 0.2 mm to 1.1 mm, the channel depth overlap lies in the range 0.1 mm to 0.4 mm, the channel spacings $S_C$ and $S_A$ lie in the range 0.5 mm to 1.5 mm and the internal channel spacing lies in the range 0.05 mm to 0.35 mm.

In the preferred configurations shown, both the anode channel 73 and the cathode channel 77 are formed to equal depths, both being greater than half the thickness of the plate. However, it will be understood that the channel depths could be unequal, the material removal process on one side of the bipolar plate being deeper than on the other side.

It will also be understood that the relative widths of the anode and cathode channels can be varied. The varying of relative widths and depths of the anode channels and the cathode channels enables variation in the relative volume of anode channels versus cathode channels, which can be useful for example, in maintaining appropriate fluid flows with different fluids.

Figure 10A:
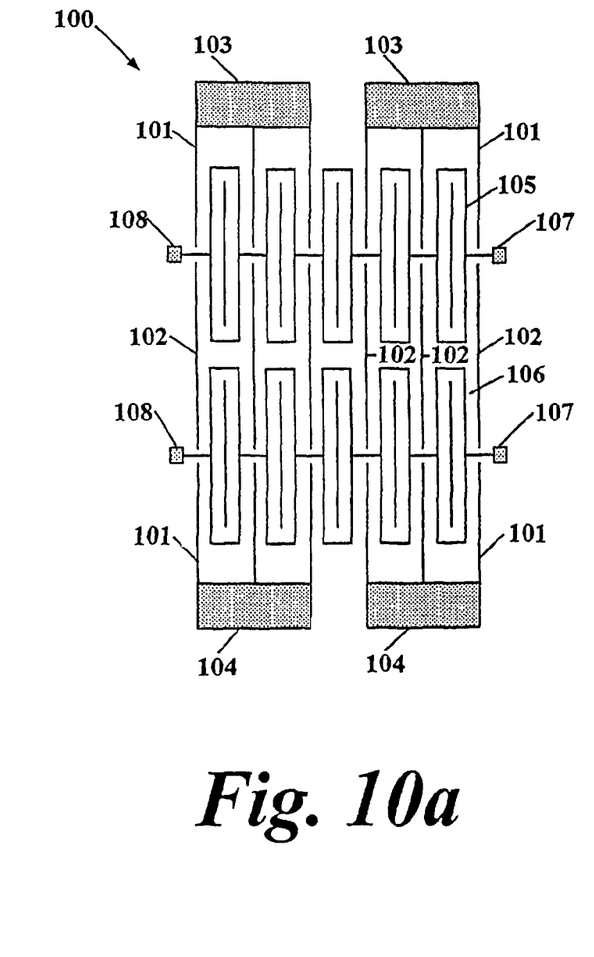
FIGS. 10a and 10b are schematic plan views of interrupted serpentine and comb channel patterns to be formed in opposing faces of the plate of FIG. 5 or FIG. 6.

A significant number of alternative channel patterns in the bipolar fluid flow field plate can be used. FIG. 10 shows two alternative such patterns. In FIG. 10*a*, channel pattern 100 comprises a first (e.g. anode) channel pattern comprising four comb structures 101, the "teeth" of which communicate with a respective intermediate channel portion 102 by way of forced diffusion through the adjacent porous electrode. It is therefore possible to maintain a fluid flow from manifolds 103 to manifolds 104 via the channels 101 and 102.

Traversing the active area of the bipolar fluid flow field plate (but on the opposite face thereof) is a second (e.g. cathode) channel pattern comprising a pair of continuous, divergent and reconvergent channels 105, 106 which enable a fluid flow to be maintained between manifolds 107 and 108.

It will be understood that the above references to anode and cathode can be reversed, so that the comb patterns are used for cathode channels and the serpentine patterns are used for anode channels.

Figure 10B:
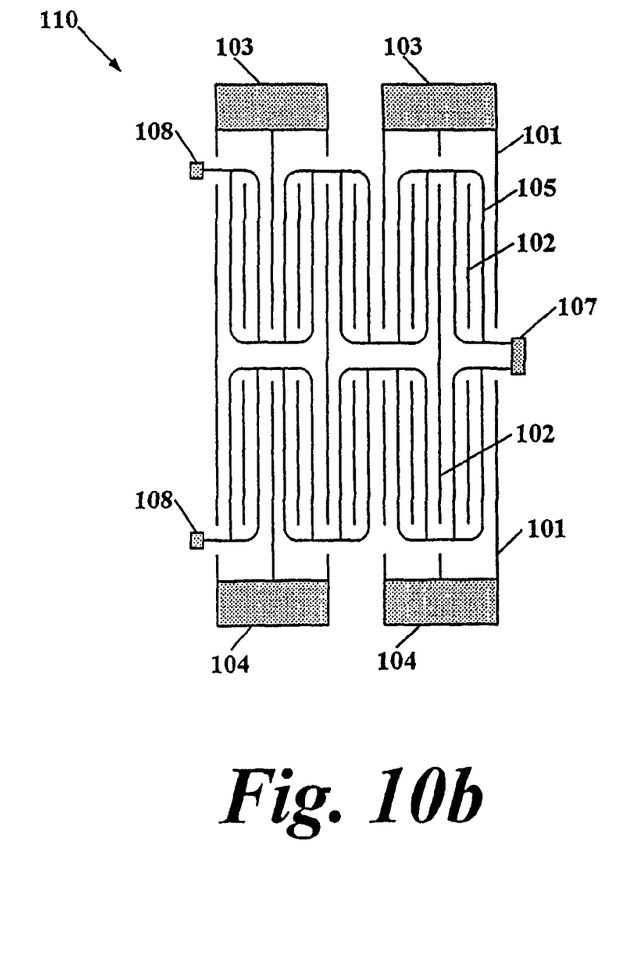

FIG. 10*b* shows an alternative channel pattern 110 to that of FIG. 10*a*, in which the continuous split divergent and reconvergent channels 105 are patterned so as to require differing lengths of intermediate channel portions 102 in the comb pattern channels 101.

In general terms, the above described embodiments allow for a combination of a continuous divergent and re-convergent fluid flow channel on one side of a bipolar fluid flow field plate together with an interdigitated "comb" style flow channel on the other side of the bipolar fluid flow field plate, both channels being to a depth that exceeds half the plate thickness. This configuration allows for a large cross-sectional flow area, within each single fluid flow track, for any given plate thickness. This provides an improved volumetric throughput, for any specified pressure drop, within such a track, for a given plate thickness.

It will be observed from FIG. 7, FIG. 10a and FIG. 10b that there are no cross-over points where any part of the anode channel structure superposes any part of the cathode channel structure. This arrangement represents an effective balance between maximising the area of channel on each side of the bipolar fluid flow plate and minimising the plate thickness. Many other geometric patterns of anode and cathode channels may be used which meet this criterion to varying degrees. In the FIG. 10a, 10b embodiments, fluid flow across "discontinuities" in the channels (e.g. between channel sections 102, 103 is effected by forced diffusion through the adjacent porous electrode (i.e. out of the plane of the fluid flow field plate).

Figure 8:
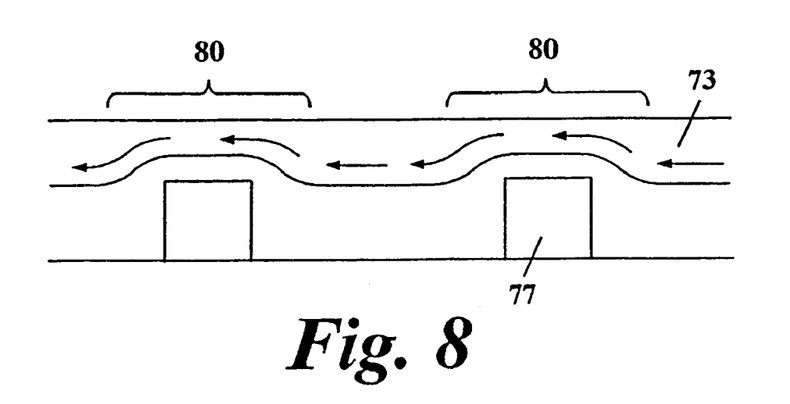
FIG. 8 is a cross-sectional view of a portion of a bipolar fluid flow field plate showing reduced channel depth crossover portions.

With reference to FIG. 8, it will be recognised that crossover points could be conveniently arranged, for example, outside the active area of the plate, e.g. in the channels leading to each individual tooth of the comb structure. In the illustration, this is done by intermittently reducing the depth $d_A$ of the channel 73 in the region 80 where the channel overlies a transverse channel 77. In this arrangement, it may be desirable to locally increase the width of the channel 73 in region 80 to compensate for the temporary loss of channel depth) thereby maintaining the fluid flow capacity of the channel.

Other methods exist for allowing limited cross-over points where anode fluid flow channels must overlie (i.e. traverse) cathode fluid flow channels and where forced diffusion through the adjacent electrode is not completely satisfactory.

It has been recognised that the porous electrodes adjacent to the fluid flow field plate and the channels therein can be conveniently fabricated with a machined, abraded or embossed surface in which small regions of localised channel formed therein can be used to provide a fluid flow path across a discontinuous fluid flow channel in the bipolar plate.

Figure 9:
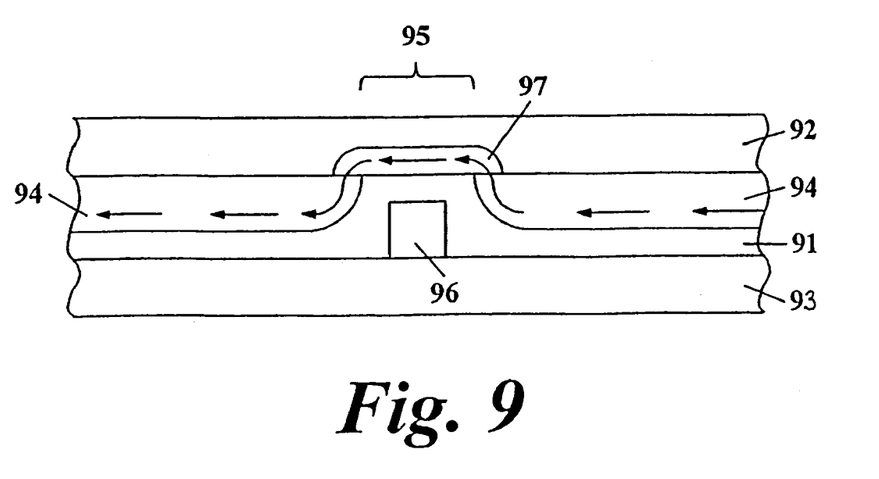
FIG. 9 is a cross-sectional view of a portion of a bipolar fluid flow field plate and adjacent porous electrodes with bypass channels therein.

Referring to FIG. 9, bipolar fluid flow plate 91 includes an anode channel 94 (extending across the drawing, as shown) with a discontinuity in region 95 where a cathode channel 96 extends transversely underneath. To provide continuity to the fluid flow indicated by the arrows, a small bypass channel 97 is formed in the surface of the anode 92 which registers with the ends of discontinuous channel 94 in the bipolar fluid flow field plate 91. Bypass channel 97 thereby allows fluid communication between the ends of the channel 94 on either side of the transverse channel 96, out of the plane of the bipolar plate 91.

Similar structures may be used when a cathode channel needs to traverse an underlying anode channel. Thus, a bypass channel 97 can equally be formed in the surface of a cathode as in the surface of the anode.

Preferably, the bypass channels 97 formed in a porous anode 92 or cathode 93 are of sufficient length only to traverse the region 95 that overlies the transverse channel 96. In a preferred embodiment, the lengths of bypass channels lies in the range 0.1 mm to 2.0 mm. The width and depth of the bypass channels preferably corresponds to the widths and depths of the channels in the bipolar fluid flow field plate with which they communicate. Preferably, the bypass channels are formed in the porous carbon electrodes using known abrasive removal techniques such as by particle impingement.

With the co-operating anode and cathode fluid flow channels 36, 37 as described above, it will be noted that if identical bipolar plates 32 were to be used in a stack (as depicted in FIG. 3), this would result in opposing anode and cathode fluid flow channels on either side of the membrane-electrode assembly 11-13 being offset from one another. If it is desired to have them overlying one another, the fluid flow channels of adjacent bipolar plates (i.e. on an alternating basis down a stack) can be laterally offset from one another in order to align anode and cathode flow channels.

Although the examples of the present invention have been described in the context of fuel cell devices requiring opposing gas streams, it will be understood that the methodology can be extended to synthesis cells using membrane or diaphragm separation with application in electrolytic production of gases in "zero-gap" cells.

Other embodiments of the invention are within the accompanying claims.

The invention claimed is:
1. A structure comprising:
    a bipolar fluid flow field plate for a fuel cell, the bipolar fluid flow field plate comprising:
        a sheet that is electrically conductive and non-porous, the sheet comprising:
            a first face comprising a first fluid flow channel; and
            a second face comprising a second fluid flow channel;
        wherein a combined depth of the first and second channels in an active area of the bipolar fluid flow field plate exceeds a thickness of the bipolar fluid flow field plate in an area that does not contain the first and second channels;
    wherein at least the first fluid flow channel is discontinuous in the first face; and
    wherein the structure further comprises:
        a porous electrode mounted adjacent to the first face, the porous electrode comprising bypass channels co-registered with discontinuous flow channels in the bipolar fluid flow field plate so as to permit fluid communication between adjacent ends of the discontinuous flow channels.

2. The structure of claim 1, wherein the bypass channels overlap portions of the bipolar fluid flow field plate where second fluid flow channels in the second face traverse a first fluid flow channel pattern in the first face.

3. A structure comprising:
    a bipolar fluid flow field plate for a fuel cell, the bipolar fluid flow field plate comprising:
        a sheet that is electrically conductive and non-porous, the sheet comprising:
            a first face comprising a first fluid flow channel; and
            a second face comprising a second fluid flow channel;
        wherein a combined depth of the first and second channels in an active area of the bipolar fluid flow field plate exceeds a thickness of the bipolar fluid flow field plate in an area that does not contain the first and second channels;
    wherein at least the first fluid flow channel is discontinuous in the first face of the bipolar fluid flow field plate; and
    wherein the structure further comprises:
        a porous electrode mounted adjacent to the first face, the porous electrode for permitting fluid communication between adjacent ends of discontinuous flow channels by forced diffusion through the porous electrode.

4. The structure of claim 3, wherein the bypass channels have a length in a range 0.1 mm to 2.0 mm.

5. A structure comprising
    a bipolar fluid flow field plate for a fuel cell, the bipolar fluid flow field plate comprising:

a sheet that is electrically conductive and non-porous, the sheet comprising:
  a first face comprising a first fluid flow channel; and
  a second face comprising a second fluid flow channel;
wherein a depth of the first fluid flow channel and a depth of the second fluid flow channel each exceeds half the thickness of the bipolar fluid flow field plate in an area that does not contain the first and second channels;
wherein at least the first fluid flow channel is discontinuous in the first face; and
wherein the structure plate further comprises:
  a porous electrode mounted adjacent to the first face, the porous electrode comprising bypass channels co-registered with discontinuous flow channels in the bipolar fluid flow field plate so as to permit fluid communication between adjacent ends of the discontinuous flow channels.

6. The structure of claim 1, wherein depths of fluid flow channels in the sheet are uniform across an entire active area of the bipolar fluid flow field plate.

7. A structure comprising:
a bipolar fluid flow field plate for a fuel cell, the bipolar fluid flow field plate comprising:
  a sheet that is electrically conductive and non-porous, the sheet comprising:
    a first face comprising a first fluid flow channel; and
    a second face comprising a second fluid flow channel;
  wherein a combined depth of the first and second channels in an active area of the bipolar fluid flow field plate exceeds a thickness of the bipolar fluid flow field plate in an area that does not contain the first and second channels;
  wherein at least a portion of a pattern including the first fluid flow channel does not overlap at least a portion of a pattern including the second fluid flow channel;
  wherein at least the first fluid flow is discontinuous in the first face of the bipolar fluid flow field plate; and
  wherein the structure further comprises:
    a porous electrode mounted adjacent to the first face, the porous electrode for permitting fluid communication between adjacent ends of discontinuous flow channels by forced diffusion through the porous electrode.

* * * * *